United States Patent [19]

Reese

[11] 4,060,991

[45] Dec. 6, 1977

[54] SUB-SURFACE IRRIGATION METHOD AND APPARATUS

[76] Inventor: Olen Dennis Reese, 4508 Third, La Mesa, Calif. 92041

[21] Appl. No.: 734,299

[22] Filed: Oct. 20, 1976

[51] Int. Cl.² .............................................. E02B 13/02
[52] U.S. Cl. ...................................... 61/13; 47/48.5; 47/81; 61/12
[58] Field of Search ...................... 61/13, 12; 47/48.5, 47/79, 80, 81; 239/542

[56] References Cited

U.S. PATENT DOCUMENTS

| | | | |
|---|---|---|---|
| 818,356 | 4/1906 | Davis | 47/81 |
| 1,052,121 | 2/1913 | Austin | 61/13 |
| 1,231,976 | 7/1917 | Weitzel | 47/81 X |
| 2,346,029 | 4/1944 | Jennings | 47/80 |
| 3,069,807 | 12/1962 | Wall | 47/81 |
| 3,407,608 | 10/1968 | Whitehead | 61/13 |
| 3,408,818 | 11/1968 | Hemphill | 61/13 |
| 3,443,385 | 5/1969 | Vollmer | 61/13 |
| 3,546,884 | 12/1970 | Timpe | 61/13 |

Primary Examiner—Dennis L. Taylor

[57] ABSTRACT

A sub-surface irrigation method and apparatus includes a moisture control unit comprising a vessel having a float control chamber in which is mounted a float responsive valve for controlling the communication of water into the float chamber with passages for communicating the water to a surrounding reservoir, and vent means for venting the float chamber to atomospheric pressure to prevent vapor lock therein. The moisture control unit is connected to a source of water and located beneath the earth's surface in close proximity to plants to which moisture is to be supplied by a network of capillary channels for communicating the moisture at least in part by capillary action to moisture pits or traps spaced laterally from a moisture control unit and either adjacent to or below plants to which moisture is supplied. An impervious cover encloses the moisture control unit to prevent the intrusion of plant roots into the unit. In accordance with the method a moisture control unit is implanted in the soil beneath the earth's surface in close proximity to plants to which moisture is to be supplied, a plurality of moisture supply channels are established between the moisture control unit and moisture traps or pits located adjacent the roots of the plants.

13 Claims, 6 Drawing Figures

SUB-SURFACE IRRIGATION METHOD AND APPARATUS

BACKGROUND OF THE INVENTION

The present invention relates to irrigation and pertains particularly to a method and apparatus for sub-surface irrigation of plants.

The provision of adequate supply of moisture to growing plants has been a problem of mankind since the beginning of time. Numerous irrigation methods and techniques have been developed over the centuries. Among the most prevalent techniques are flood irrigation, sprinkler irrigation, and drip irrigation. Flood irrigation and sprinkler irrigation are utilized where water supplies are plentiful. Drip irrigation and sub-surface irrigation methods are utilized where water is scarce.

The supplying of only sufficient moisture for adequate growth of the plant directly to the roots of the plant is a technique which has been recently developed in view of the overwhelming demands on limited water supplies. Such techniques avoid the loss of large amounts of water by evaporation, run-off into adjacent areas and absorption into adjacent soil.

Among the prior art approaches to sub-surface irrigation are those illustrated in or disclosed, for example, in U.S. Pat. No. 3,443,385 issued May 13, 1969 to Voemer; U.S. Pat. No. 3,183,674 issued May 18, 1965 to Boschen; U.S. Pat. No. 1,343,871 issued June 15, 1920 to Lewis; and Italian Pat. No. 368074 issued in 1939.

The moisture control apparatus such as disclosed in the above mentioned Vollmer patent has come into widespread use in recent years because of its normally trouble free operation and conservation of water. This irrigation control system however has some minor drawbacks discovered only after extensive use. One of such drawbacks is the discovery that the system will fail to function in certain soil conditions. It is believed after extensive investigation, that this failure to function is due to a vapor lock within the moisture control unit.

Another drawback to the use of the system as disclosed in the above patent is that tree roots tend to extend to an available source of water. This results in tree roots extending into and entangling the mechanism of the moisture supply unit. Such tree roots tend to accumulate within the unit and prevent its normal operation.

Accordingly, it is desirable that a system be devised which overcomes these problems of the prior art.

SUMMARY AND OBJECTS OF THE INVENTION

It is the primary object of the present invention to provide method and apparatus for overcoming the above problems of the prior art.

Another object of the present invention is to provide a sub-surface irrigation apparatus that functions to supply a controlled amount of moisture under all soil conditions.

A further object of the present invention is to provide a sub-surface irrigation system that eliminates the problem of fouling from plant roots.

A still further object of the present invention is the provision of a method of sub-surface irrigation that is functional and reliable in all soil conditions and avoids the problem of entanglement by plant roots.

In accordance with the primary aspects of the present invention, a moisture control unit is provided with vent means to prevent vapor lock and is provided with moisture distribution channels for distributing moisture to remote positions from the moisture control unit to prevent root fouling of the moisture control unit.

BRIEF DESCRIPTION OF THE DRAWING

The above and other objects and advantages of the present invention will become apparent from the following description and when read in conjunction with the drawings wherein.

DETAILED DESCRIPTION OF THE DRAWINGS

Figure 1:
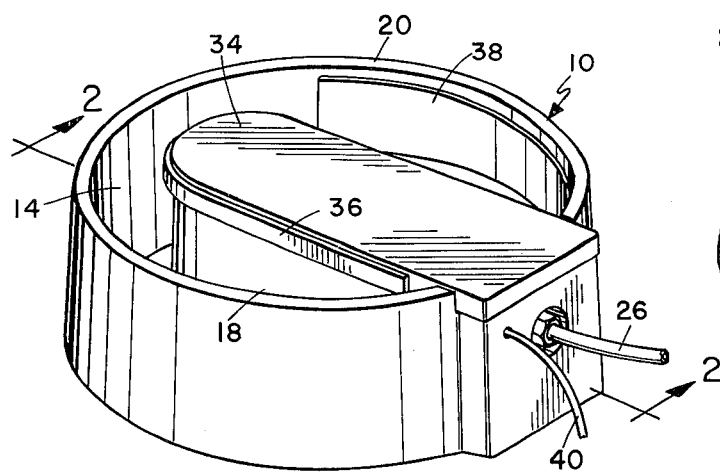
FIG. 1 is a perspective view of the moisture unit in accordance with the present invention.
Figure 3:
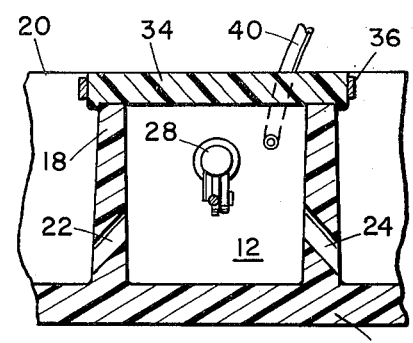
FIG. 3 is a sectional view taken on line 3—3 of FIG. 2.
Figure 2:
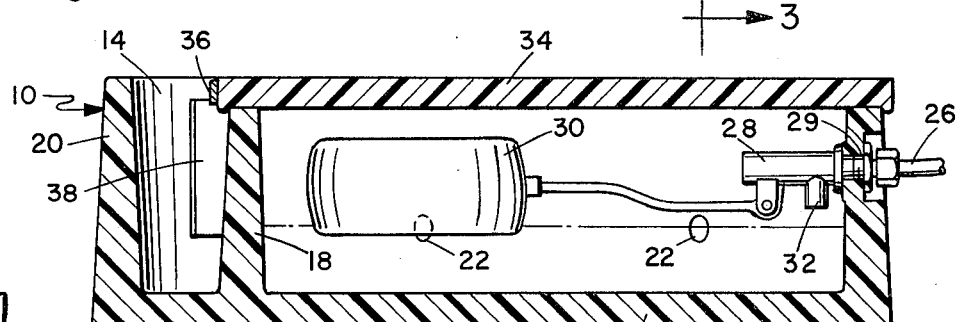
FIG. 2 is an enlarged sectional view taken on line 2—2 of FIG. 1.

Turning now to the drawings and particularly FIGS. 1 through 3, there is illustrated a moisture control unit generally designated by the numeral 10 comprising a vessel having an inner control chamber 12 and a reservoir 14. The chamber 12 and reservoir 14 are defined by common bottom 16 with upwardly extending side walls 18 extending upward theefrom for defining an elongated chamber 12 for containing a float valve and float mechanism as illustrated. A generally circular or annular upstanding wall 20 defines the water reservoir 14. A plurality of passages 22 and 24 provide communication of water from the float control chamber 12 into the water reservoir 14. Water is commuhiated into the vessel by means of conduit 26 connected to a source of water not shown and connected in a suitable manner to a float valve 28 mounted within a bore 29 in wall 20, and which is controlled by a float 30 for permitting or controlling the communication of water by way of the conduit 26 to the valve outlet 32. The level of water within the float control chamber 12 is maintained preferably above the passages 22 and 24 and is controlled in a known manner by controlling the position of float 30 and its actuation of the valve 28.

A cover 34 closes the chamber 12 and shields the float chamber from debris and other matter. Cathodic protection to the elements of the valve are provided by means of metal strips 36 and 38 provided within the unit. These metal strips are higher in electrochemical series than the parts of the valve 28 and prevent or reduce corrosion of the valve by electrolythic action. Vent means comprising a vent conduit 40 having one end communicating with chamber 12 and the opposite end extending above the ground surface and communicating with the atmosphere is provided for venting the chamber. The venting of the chamber prevents vapor lock which is found to occur under certain conditions. The water reservoir is a convenient device for providing for the accumulation of water outside the float valve chamber 12 for contacting with suitable capillary transports means for transporting the moisture to remote locations for supply to the roots of plants.

Figure 4:
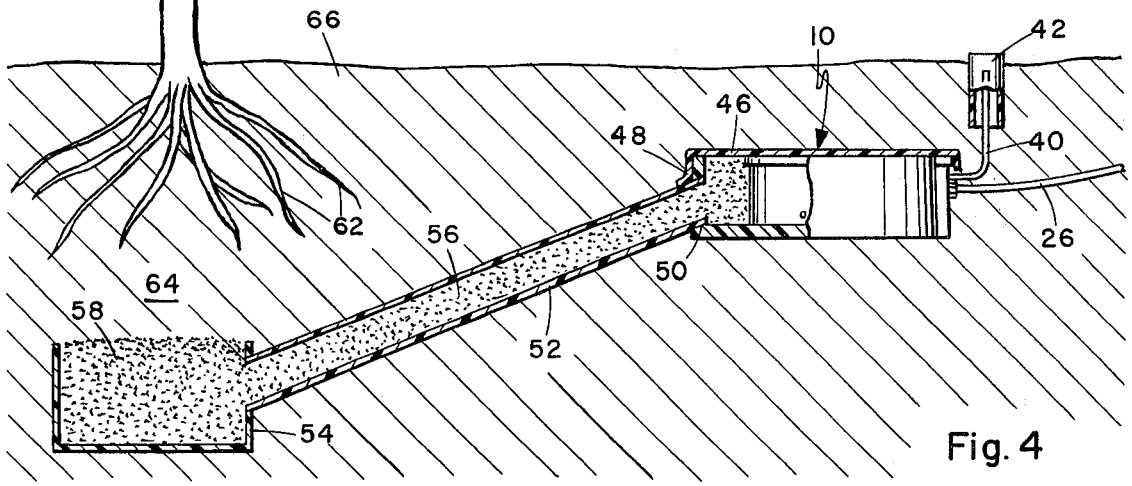
FIG. 4 illustrates a typical use of the moisturizer unit.

When the moisture control unit is installed in its subsurface position as shown in FIG. 4, the vent line 40 is extended upward to the surface or to communication with the atmosphere near the surface of the earth where it is preferably covered by suitable shield means 42. This open vent to the atmosphere ensures that vapor lock will not occur in the unit.

Due the essentially trouble free nature of the moisture control unit in accordance with the invention, the typical installation comprises the selection and installing of a unit below the earth's surface as shown in FIG. 4. The unit is simply buried beneath the surface in a location laterally spaced from plants to be irrigated. Moisture is then conveyed or communicated to the roots of the selected plants by moisture conducting means which at least partially employs capillary action. The conveyance of moisture to the roots of the plants is carried out by establishing a plurality of moisture lines communicating between the reservoir of the moisture control unit and one or more sand traps or the like located adjacent the roots of the plant.

As illustrated in FIG. 4, a typical installation include burying the unit beneath the surface of the ground and connecting the conduit 26 to a suitable source of water. A suitable impervious shield is provided around the moisture control unit such as a lid or cover 46 of suitable sheet of material such as polyurethane plastic which completely covers the unit shielding it from the intrusion of plant roots. In the illustrated example, the cover 46 simply covers and extends downward over the water reservoir and includes a lip 48 extending downward for sealing engagement with the outer walls of the reservoir. Communication with the water reservoir is established by an opening 50 through which is mounted a conduit such as a plastic conduit or pipe 52 communicating with the reservoir and extending laterally downward to a position beneath a tree to a moisture trap defined by a container member 54. A suitable material such as sand having the ability to create very rapid capillary action or transmission of water by capillary action is placed in the cavity defined by the reservoir 14 of the conduit 52 and the container 54. This sand 56 provides a capillary path from the reservoir 14 to the container 54 and the moisture pit 58 established therein. This moisture pit is placed beneath a new plant 60 before the plane is placed in the soil. The roots 62 of the plant 60 can then extend downward to obtain moisture from the moisture pit 58.

While the conduit 52 is illustrated as being sloping downward, it need not be so sloped and may for example even slope upward a slight degree. The transfer of water through the sand medium within the conduit 56 from the reservoir 14 is carried out at least partially by capillary action. In the case of a downwardly sloping drain as is illustrated the water may flow downward through the sand through the conduit 52 into the moisture pit 58. From the moisture pit 58, moisture is carried by capillary action upward into the soil 64 above the sand pit 58 where the roots 62 of the tree are located. By this apparatus, the area below the roots of the tree is maintained moist constantly supplying moisture to the tree while at the same time the ground surface 66 surrounding the tree is or may be completely dry.

This arrangement provides a ready and maintenance free method of and system for supplying moisture to plants and trees. This method conserves moisture in that only the moisture needed for the tree or plant is provided to the plant. Very little evaporation takes place from the ground surface 66 as in other methods of moisture application. Transportation of the moisture from the moisture pit to the tree roots is carried out by capillary rise. A table showing the rate and height in inches of capillary rise in typical soils is as follows:

| TIME | CAPILLARY RISE (INCHES) | | |
|---|---|---|---|
| | SAND | SILT LOAM | CLAY |
| ½ hours | 13.5 | 7.3 | 5.4 |
| 1 hours | 14.3 | 11.2 | 8.0 |
| 6 hours | 16.6 | 26.6 | 15.5 |
| 12 hours | 17.2 | 35.3 | 18.5 |
| 24 hours | 18.5 | 46.4 | 21.0 |
| 72 hours | 20.3 | 65.4 | 24.7 |

Figure 5:
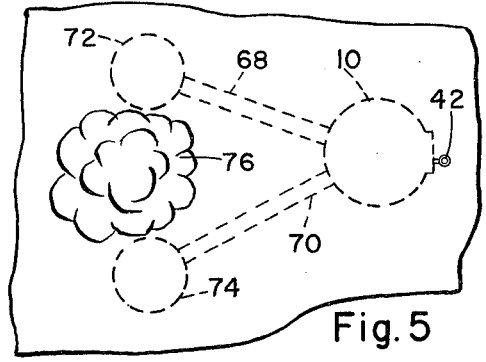
FIG. 5 is a top plan view of a system installation in accordance with the present invention.

Turning now to FIG. 5, there is illustrated a plan view of a system shown below the ground wherein a moisture control unit 10 is provided with a pair of conduits 68 and 70 extending outward therefrom to moisture pits 72 and 74 to either side of a mature tree 76. With this arrangement, the system may be installed for supplying moisture to mature trees without the necessity of removing and replacing the tree. The sand pits 70 and 74 are simply placed adjacent to the root structure of the trees sufficiently below thereof to supply the necessary moisture at the same time avoiding undue destruction of the root system.

It will also be appreciated that the system may be laid out to supply a plurality of plants from a single moisture control unit. As for example, a plurality of lines such as 68 and 70 may radiate outwardly from a moisture control unit 10 in the form of spokes extending outward from a central axis. In addition, additional branches may also be taken off of any one supply line for supplying adjacent plants. Still other lines may be taken off to supply further moisture pits adjacent to existing pits. This however may run the risk of failure to supply sufficient moisture to plants further down the line from the moisture control unit.

Figure 6:
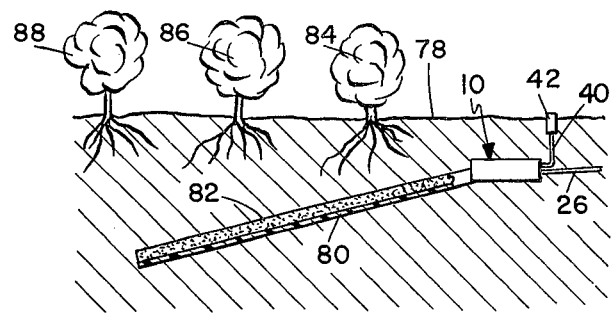
FIG. 6 is an elevational view in section of an alternate embodiment of the invention.

A still further embodiment of the invention is illustrated in FIG. 6 wherein identical elements are identified by identical numerals. In this embodiment, a moisture control unit 10 having the usual supply conduit 26 and vent means 40 and 42 is buried beneath an earth surface 78. A combined moisture supply line and pit is established by an open trough member 80 connected in the usual manner to the moisture control unit and having a suitable body 82 of sand or similar material for the transport of the moisture from the moisture control unit 10 to a position below the roots of a plurality of trees 84, 86 and 88. The open trough 80 includes an impervious portion on the bottom side thereof as illustrated but is open at the top to permit moisture to move by capillary action from the body of sand 82 upward through the soil to the roots of the trees. The slope of the trough 80 may aid in the transport of moisture from the control unit 10 to the outer most end of the trough. The slope of the trough may be established as necessary to provide the optimum transport of moisture from the control unit to the outermost tree 88.

While the present invention has been described and illustrated by means of specific embodiments, it is to be understood that numerous changes and modifications may be made therein without departing from the spirit and scope of the invention as defined in the appended claims.

Having described my invention, I now claim.

1. A sub-surface moisture distribution and control system for controlling the supply of moisture to the roots of plants comprising:
- a moisture control unit, said unit comprising a vessel submerged beneath the surface of the earth, said vessel having a float chamber and a water reservoir surrounding and communicating with the float chamber;
- an inlet to said float chamber for connecting to a source of water;
- valve means responsive to the level of water in said float chamber for controlling the communication of water to said vessel;
- air vent means for venting said float chamber to atmosphere for preventing vapor lock of said unit; and
- moisture conducting means for conducting moisture from said water reservoir to plant roots remotely spaced laterally from said moisture control unit;
- said moisture conducing means comprises a body of porous material having a higher porosity than the surrounding earth formation and disposed in conduit means having at lest impervious bottom and side walls, and one portion of said conducting means in intimate communication with water flowing from said float valve chamber and extending to a moisture pit adjacent to the roots of aplant for conveying moisture thereto.

2. The moisture distribution system as claimed in claim 1 including:
- impervious means enclosing said water reservoir, and said conduit means being an impervious pipe.

3. The moisture distribution system as claimed in claim 2, wherein:
- said moisture pit consists of a submerged body of porous material having a capillary rise of at least one foot in one-half hour disposed within an open top impervious container.

4. The moisture distribution system as claimed in claim 3, wherein:
- said porous material consists of a body of sand.

5. The moisture distribution system as claimed in claim 1, wherein:
- said means for conducting moisture from said reservoir to said plant roots comprises an open trough having one end in communication with said reservoir and extending laterally from said moisture control unit to a position closely adjacent to the roots of a plurality of plants and a body of sand filling said trough and said reservoir.

6. In a sub-surface method of supplying moisture to the roots of plants comprising the steps of:
- selecting a water control unit defining an enclosed chamber containing an inlet and a float control valve for controlling the level of water within said chamber;
- submerging said water control unit beneath the surface of the earth;
- connecting said float control valve with a source of water;
- establishing moisture conducting means for conducting moisture at least partially by capillary action from said water supply chamber to a remote position remote from said control unit adjacent to the roots of a plant, by the further steps of forming an enlarged impervious pit adjacent the roots of said plant and providing impervious conduit means extending between said pit and said water control unit and forming a body of pervious material to extend through said conduit to said pit from said water control unit.

7. The method in accordance with claim 6, including the step of:
- placing an open trough defined by a body of impervious material extending from said water control unit to said position adjacent said plant and filling said trough with a body of pervious material extending along said trough from said water control unit.

8. The method in accordance with claim 6, wherein:
- the step of forming said pit is carried out prior to and directly beneath said plant.

9. The method in accordance with claim 6 wherein:
- said pit is formed laterally from and adjacent to the roots of a pre-planted plant.

10. The method in accordance with claim 7 including the step of:
- extending said trough for a substantial distance out from said control unit and planting a plurality of plants above said trough.

11. The method of claim 10 including the step of:
- extending a plurality of said troughs radially outward from said control unit.

12. The method in accordance with claim 8 including:
- establishing a plurality of said moisture pits radially outward from said control units and providing a plurality of said conduit means communicating between said control unit and said moisture pits.

13. The method in accordance with claim 6 including:
- shielding said water control unit from plant roots by covering said unit with a sheet of impervious material.

* * * * *